(12) United States Patent
Higemoto et al.

(10) Patent No.: US 8,872,620 B2
(45) Date of Patent: Oct. 28, 2014

(54) WIRELESS KEY SYSTEM AND KEY LOCATION DETERMINATION METHOD

(75) Inventors: Nobumasa Higemoto, Kanagawa (JP); Takashi Taya, Tokyo (JP)

(73) Assignee: Lapis Semiconductor Co., Ltd., Yokohama (JP)

( * ) Notice: Subject to any disclaimer, the term of this patent is extended or adjusted under 35 U.S.C. 154(b) by 197 days.

(21) Appl. No.: 13/229,823

(22) Filed: Sep. 12, 2011

(65) Prior Publication Data

US 2012/0286926 A1 Nov. 15, 2012

(30) Foreign Application Priority Data

Sep. 13, 2010 (JP) .................................. 2010-204343

(51) Int. Cl.
*G05B 19/00* (2006.01)
*G01S 13/82* (2006.01)
*H04B 17/00* (2006.01)
*B60R 25/24* (2013.01)
*H04B 7/08* (2006.01)

(52) U.S. Cl.
CPC .............. *G01S 13/82* (2013.01); *H04B 7/0825* (2013.01); *H04B 17/0072* (2013.01); *H04B 7/086* (2013.01); *B60R 25/24* (2013.01)
USPC ............... 340/5.61; 340/426.13; 340/426.17; 340/5.2; 340/5.72

(58) Field of Classification Search
None
See application file for complete search history.

(56) References Cited

U.S. PATENT DOCUMENTS 8,587,403 B2 * 11/2013 Ghabra et al. ............... 340/5.61
2005/0046546 A1 3/2005 Masudaya
2010/0321154 A1 12/2010 Ghabra et al.

FOREIGN PATENT DOCUMENTS

JP 2005-072972 A 3/2005
JP 2007-170162 A 7/2007
JP 2008-115648 5/2008

OTHER PUBLICATIONS

Japanese Notice of Rejection dated Mar. 24, 2014.

* cited by examiner

*Primary Examiner* — Mohammad Ghayour
*Assistant Examiner* — Brian Wilson
(74) *Attorney, Agent, or Firm* — Volentine & Whitt, PLLC

(57) ABSTRACT

A wireless key system and location detection method determine whether a wireless key is located inside or outside a main body. A communication device in the main body transmits a wireless signal using an inner antenna and an outer antenna outside the main body having a different directivity. A wireless key measures direction of movement of the wireless key when the wireless signal is received by one of antennas having different directivities, detects one of the antennas receiving the highest signal level of the wireless signal as a first antenna, selects one of the antennas having the same directivity as the inner antenna as a second antenna according to the measured direction of movement and detected directivity of the antenna, and decides that the wireless key is inside the main body based on the signal levels of the wireless signals received by the first and second antennas.

10 Claims, 3 Drawing Sheets

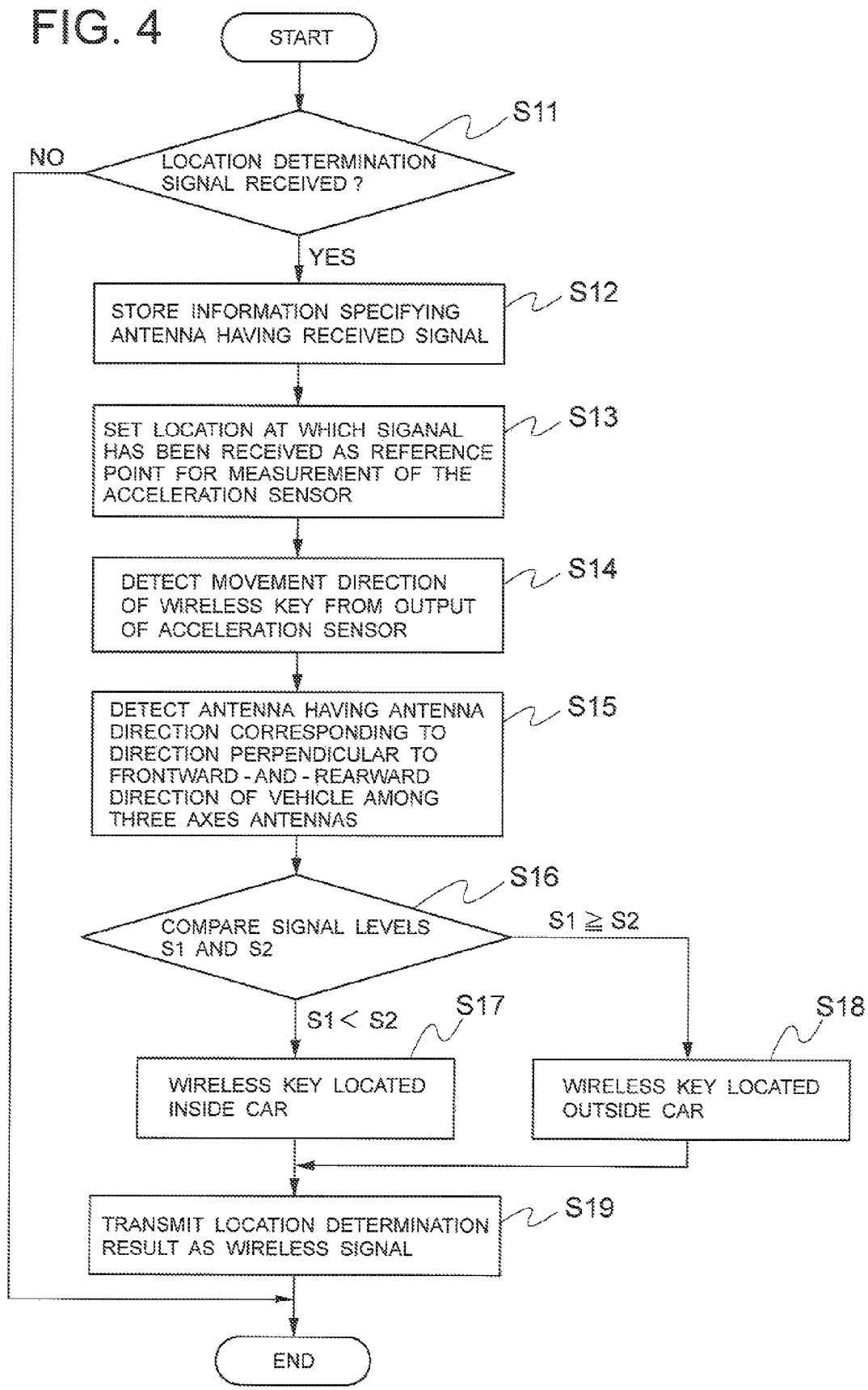

WIRELESS KEY SYSTEM AND KEY LOCATION DETERMINATION METHOD

BACKGROUND OF THE INVENTION

1. Technical Field

The present invention relates to a wireless key system to perform wireless communication between a main body communication device mounted in a main body, such as a vehicle or a house, and a movable wireless key.

2. Description of the Related Art

There is a known wireless key system that automatically locks/unlocks a vehicle door when a wireless key (electronic key) carried by a user who moves approaches a communication device mounted at the vehicle door (see Patent literature 1). In such a wireless key system for vehicles, wireless communication is performed between the communication device and the wireless key when the wireless key enters an area around the communication device and, at the same time, a signal containing an identification code (ID code) transmitted from the wireless key is received by the communication device through wireless communication. The communication device compares the identification code of the wireless key contained in the received signal with an identification code stored in a memory of the communication device. Upon determining that the identification codes coincide with each other as the result of the comparison, locking or unlocking of the vehicle door is allowed.

In such a wireless key system for vehicles, a low frequency (LF) radio wave is generally used for communication from the vehicle side communication device to the wireless key, and an ultra high frequency (UHF) radio wave is generally used for communication from the wireless key to the vehicle side communication device. In addition, there is provided a long wave receiving antenna on the wireless key side which is formed of a three axes antenna having directivities in X-axis, Y-axis and Z-axis in view of the directivity of an antenna.

Also, in such a wireless key system for vehicles, transmitting antennas are mounted inside and outside the vehicle and the wireless key has a function to measure intensities of received signals. The function to measure intensities of received signals is as follows. It is determined whether the wireless key is located inside or outside the vehicle based on signal intensities obtained through the three axes antenna, respectively, from a wireless signal transmitted from the vehicle side communication device through a plurality of transmitting antennas and the determination result is transmitted to the vehicle side communication device using a wireless signal. In addition, the vehicle side communication device has a function to perform operations that the vehicle door is automatically locked upon determining, for example, that the wireless key is moved out of the vehicle according to the wireless signal of the determination result, or the vehicle door is automatically unlocked when the wireless key approaches the vehicle.

Patent literature 1: Japanese Patent Kokai No. 2008-115648

SUMMARY OF THE INVENTION

In the conventional wireless key system, it is determined whether the wireless key is located inside or outside the main body based on the intensities of a wireless signal transmitted from the main body side communication device and received by the wireless key, as described above. However, the intensities of the received signal may be changed due to reflection of the wireless signal from the main body communication device, mixing of noise or crosstalk or saturation caused by the wireless signal from the plurality of transmitting antennas with the result that it is not always possible to perform correct determination.

In the system disclosed in Patent literature 1, signal intensity around the vehicle is previously measured, a relationship between the signal intensity and the distance from an antenna is stored, and the location of the wireless key is determined using such a relationship, thereby solving the above problems. In such a key location determination method, however, it is necessary to acquire data previously, so that the entire process becomes complicated.

The present invention has been made in view of the above problems, and it is an object of the present invention to provide a wireless key system and a key location detection method that are capable of correctly determining whether a wireless key is located inside or outside a main body through a simple process.

The present invention provides a wireless key system to perform wireless communication between a wireless key movable separately from a main body and a communication device mounted in the main body, wherein the communication device has a component which transmits a wireless signal through an inner antenna provided inside the main body and an outer antenna provided outside the main body, the outer antenna having a directivity different from that of the inner antenna, and the wireless key includes a determination component which determines whether the wireless signal has been received by any one of antennas having different directivities, a measuring component which measures a direction of movement of the wireless key when the receipt of the wireless signal has been determined by the determination unit, a detecting component which detects one of the antennas having received the highest signal level of the wireless signal as a first antenna, a selecting component which selects one of the antennas having the same directivity as the inner antenna as a second antenna according to the direction of movement measured by the measuring component and the detected directivity of the antenna, and a deciding component which decides that the wireless key is located inside the main body when the signal level of the wireless signal received by the second antenna is greater than the signal level of the wireless signal received by the first antenna.

The present invention also provides a wireless key location determination method of a wireless key system to perform wireless communication between the wireless key movable separately from a main body and a communication device mounted in the main body, including transmitting a wireless signal through an inner antenna provided inside the main body and an outer antenna provided outside the main body, the outer antenna having a directivity different from that of the inner antenna, determining whether the wireless signal has been received by any one of antennas having different directivities, measuring a direction of movement of the wireless key when the receipt of the wireless signal has been determined at the determination step, detecting one of the antennas having received the highest signal level of the wireless signal as a first antenna, selecting one of the antennas having the same directivity as the inner antenna as a second antenna according to the direction of movement measured at the measurement step and the detected directivity of the antenna, and deciding that the wireless key is located inside the main body when the signal level of the wireless signal received by the second antenna is greater than the signal level of the wireless signal received by the first antenna.

In the wireless key system and key location detection method according to the present invention, one antenna (second antenna) is determined and selected among a plurality of antennas of the wireless key that is capable of satisfactorily receiving a signal transmitted from an inner antenna provided inside a main body based on the directivity of an antenna (first antenna) having received the highest signal level of a wireless signal when a wireless key is located outside the main body and the direction of movement of the wireless key and it is decided that the wireless key is located inside the main body when the signal level of the wireless signal received by the second antenna is greater than the signal level of the wireless signal received by the first antenna. Consequently, it is possible to correctly determine whether the wireless key is located inside or outside the main body through a simple process.

BRIEF EXPLANATION OF THE DRAWINGS

FIG. 4 is a flow chart showing a location determination operation performed by a controller in the wireless key.

DETAILED DESCRIPTION OF THE PREFERRED EMBODIMENT

Hereinafter, an embodiment of the present invention will be described in detail with reference to the accompanying drawings.

Figure 1:
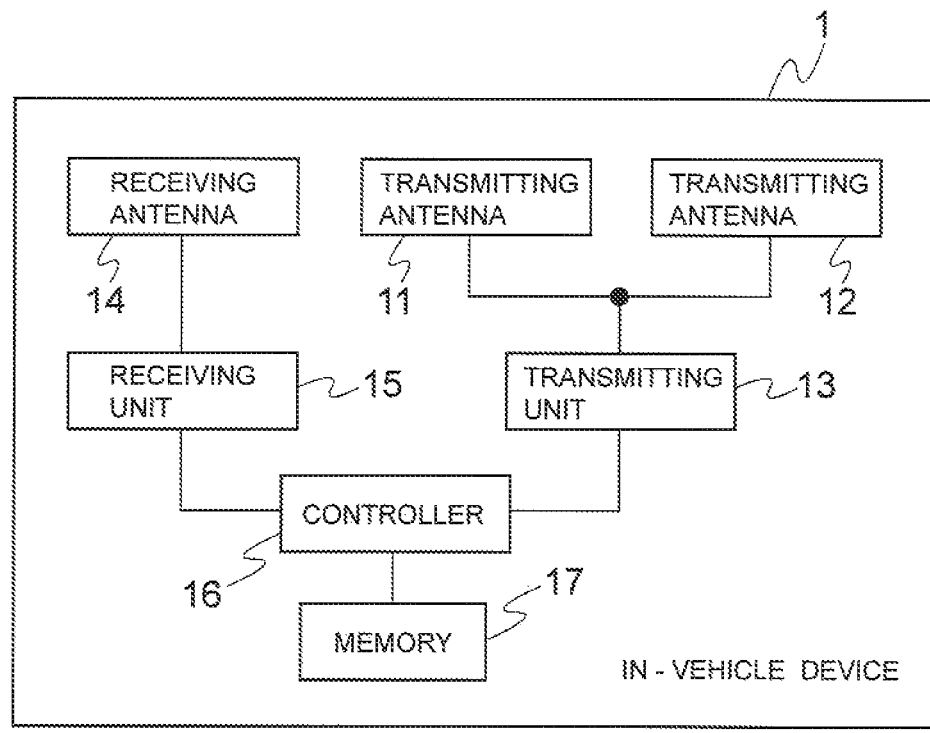
FIG. 1 is a block diagram showing the construction of a wireless key system for vehicles according to the present invention.
Figure 1:
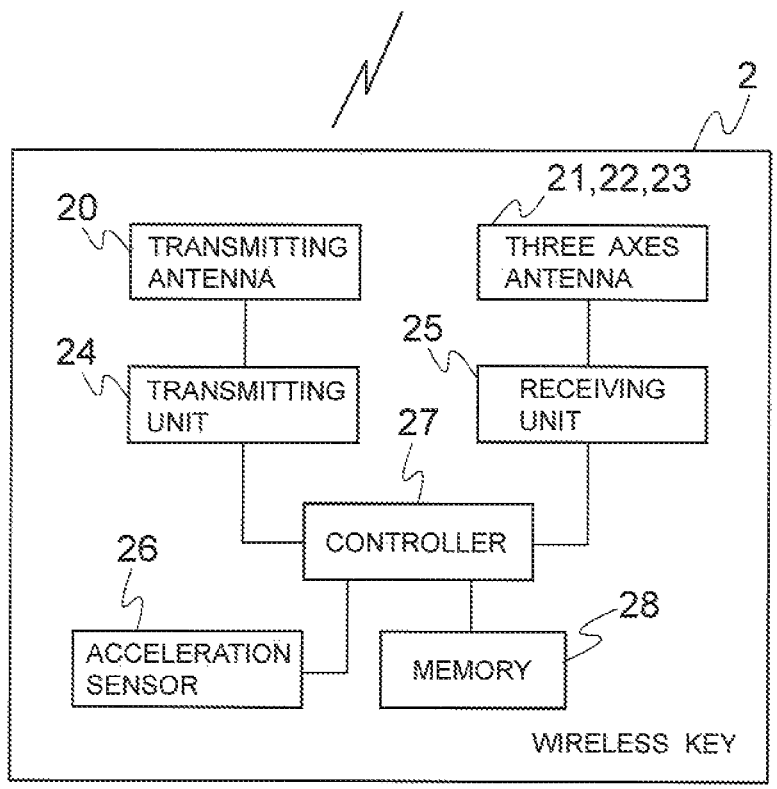

FIG. 1 shows a wireless key system for vehicles as an embodiment of the present invention. The wireless key system for vehicles includes an in-vehicle device (communication device) 1 and a wireless key 2. Control of a vehicle, such as permission of engine starting and locking/unlocking of vehicle doors, is performed through two-way wireless communication between the in-vehicle device 1 and the wireless key 2.

Figure 2:
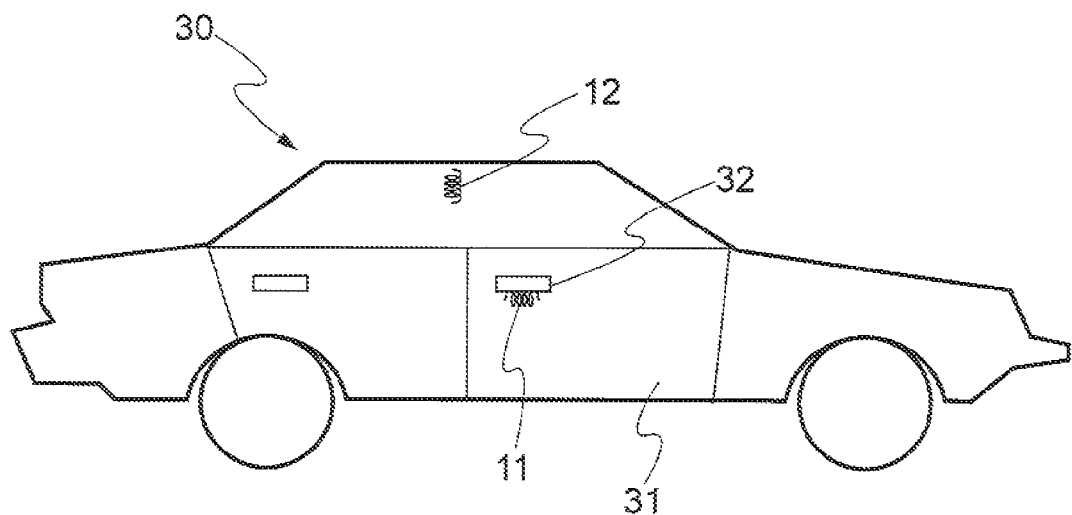
FIG. 2 is a view showing the disposition of antennas in a vehicle.

The in-vehicle device 1 includes transmitting antennas 11 and 12, a transmitting unit 13, a receiving antenna 14, a receiving unit 15, a controller 16 and a memory 17. The transmitting antennas 11 and 12 are low frequency (LF) antennas. As shown in FIG. 2, the transmitting antenna 11 is an outer antenna mounted in a door knob (door handle) 32 of a four-wheel automotive vehicle 30. The transmitting antenna 12 is an inner antenna mounted in a ceiling of the vehicle 30. The transmitting unit 13 outputs a transmission signal to the transmitting antennas 11 and 12 according to an instruction from the controller 16. Opposite ends of an antenna coil of the transmitting antenna 11 are disposed in the frontward-and-rearward direction of the vehicle 30, i.e. in the horizontal direction. The transmitting antenna 11 transmits the transmission signal as an electromagnetic wave (wireless signal) having a directivity in the horizontal direction. The transmitting antenna 12 transmits the transmission signal as an electromagnetic wave having a directivity in the vertical direction. Meanwhile, having the directivity in the horizontal direction means that the gain of a horizontal emission pattern is greater than the gain of a vertical emission pattern and having the directivity in the vertical direction means that the gain of the vertical emission pattern is greater than the gain of the horizontal emission pattern.

Also, the interior of the vehicle 30 is electromagnetically shielded from the wireless signal transmitted from the transmitting antenna 11 by a door 31 made of a metal plate.

The receiving antenna 14 is an ultra high frequency (UHF) antenna. Although not shown in FIG. 2, the receiving antenna 14 may be formed, for example, in a rear glass of the vehicle 30. The receiving unit 15 extracts and detects a received signal having a desired frequency from signals received by the receiving antenna 14 and supplies the detected signal to the controller 16.

The controller 16 is connected to the transmitting unit 13, the receiving unit 15 and the memory 17 to control the operation of the in-vehicle device 1. The memory 17 stores various data, such as programs and authentication codes necessary for control.

The wireless key 2 is provided separately from the vehicle 30. A driver of the vehicle 30 carries the wireless key 2 outside the vehicle 30. The wireless key 2 includes a transmitting antenna 20, a three axes antenna (constituted by an X-axis antenna 21, a Y-axis antenna 22 and a Z-axis antenna 23), a transmitting unit 24, a receiving unit 25, an acceleration sensor 26, a controller 27 and a memory 28.

Figure 3:
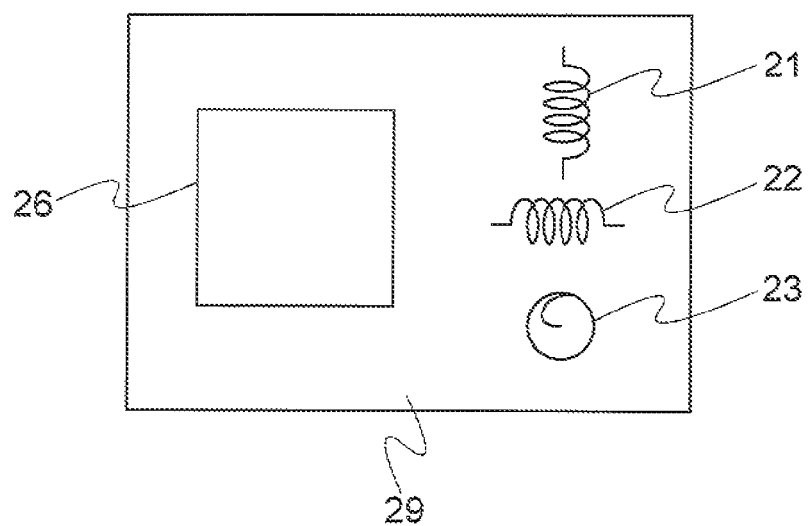
FIG. 3 is a view showing antennas of a three axes antenna and an acceleration sensor disposed on a board in a wireless key.

The X-axis antenna 21, the Y-axis antenna 22 and the Z-axis antenna 23 each have antenna coils. As shown in FIG. 3, opposite ends of the antenna coils of the respective antennas are disposed at a board 29 so that the antennas are perpendicular to each other and the antennas have directivities different from each other by 90 degrees. The transmitting unit 24 outputs a transmission signal to the transmitting antenna 20 according to an instruction from the controller 27. The receiving unit 25 extracts and detects a received signal having a desired frequency from signals received by the antennas 21 to 23 of the three axes antenna and supplies the detected signal to the controller 27. Also, the receiving unit 25 detects levels (signal intensities) of signals received by the antennas 21 to 23 of the three axes antenna and supplies the detected levels to the controller 27.

As shown in FIG. 3, the acceleration sensor 26 is attached to the board 29 to measure the direction of movement of the wireless key 2.

The controller 27 is connected to the transmitting unit 24, the receiving unit 25, the acceleration sensor 26 and the memory 28 to control the operation of the wireless key 2. The memory 28 stores various data, such as programs and authentication codes necessary for control.

In the communication system for vehicles with the above-stated construction, any one of the three axes antennas 21 to 23 of the wireless key 2 receives a location determination signal constantly or intermittently transmitted from the transmitting antennas 11 and 12 of the in-vehicle device 1 in a wireless fashion and it is determined whether the wireless key 2 is located inside or outside the vehicle 30 based on the level of the received signal. The determination result is transmitted to the in-vehicle device 1 from the wireless key 2 as a wireless signal together with an authentication code.

An operation to determine the location of the wireless key 2 is performed by the controller 27. In the determination operation, as shown in FIG. 4, the controller 27 determines whether a location determination signal has been received by any one of the three axes antennas, i.e. the X-axis antenna 21, the Y-axis antenna 22 and the Z-axis antenna 23, based on the level of the received signal obtained by the receiving unit 25 (Step S11). Upon determining that the location determination signal has been received, the antenna having received the signal (first antenna) is stored in the memory 29 as information (Step S12). If the location determination signal is received by a plurality of antennas at Step S12, an antenna having the highest level of the location determination signal is selected and information specifying the antenna is stored.

Also, upon determining that the location determination signal has been received, a location at which the signal has been received is stored as a reference point of the acceleration sensor 26 (Step S13). The direction of movement is measured from an output signal of the acceleration sensor 26 from the reference point (Step S14). At Step S14, the controller 27 calculates the direction of movement of the wireless key 2 from the output signal of the acceleration sensor 26 according to a predetermined calculation expression. Meanwhile, the movement distance of the wireless key 2 may be simultaneously calculated and the direction of movement of the wireless key 2 may be measured when the wireless key has been continuously moved by a predetermined distance in the same direction.

Upon determining that the location determination signal has not been received, the determination operation is interrupted and Step S11 is performed again.

After Step S14 is performed, an antenna (second antenna) having an antenna direction corresponding to the direction perpendicular to the frontward-and-rearward direction of the vehicle 30 among the three axes antennas 21 to 23 is detected according to the information of the antenna having received the signal stored in the memory 28 at Step S12 and the direction of movement of the wireless key 2 detected at Step S14 (Step S15). That is, an antenna suitable for receiving a wireless signal having a directivity in the vertical direction sent from the transmitting antenna 12 (an antenna having a directivity in the vertical direction) is detected. For example, if the antenna having received the signal stored as information at Step S12 is the X-axis antenna 21 and the direction of movement detected at Step S14 almost coincides with the antenna direction of the Y-axis antenna 22, the Z-axis antenna 23 is detected as an antenna extending in the direction perpendicular to the frontward-and-rearward direction of the vehicle 30 at Step S15.

Subsequently, a signal level S1 of the signal received by the antenna having received the signal stored at Step S12 and a signal level S2 of the signal received by the antenna detected at Step S15 are compared (Step S16). If S1<S2, it is determined that the wireless key 2 is located inside the vehicle 30 (Step S17). If S1≥S2, it is determined that the wireless key 2 is located outside the vehicle 30 (Step S18). The determination result of Step S17 or S18 is transmitted to the in-vehicle device 1 as a wireless signal together with an authentication code (Step S19). At Step S19, the transmitting unit 24 transmits the wireless signal from the transmitting antenna 20 according to an instruction to transmit the determination result from the controller 27.

If the wireless signal transmitted at Step S19 is received by the receiving unit 15 of the in-vehicle device 1 through the receiving antenna 14, the controller 16 compares the authentication code contained in the wireless signal with an authentication code previously stored in memory 17 to confirm whether these authentication codes are identical to each other. After that, if it is detected that the wireless key 2 is located inside the vehicle 30 from the determination result contained in the wireless signal, it is possible for, for example, a driver, to start an engine (not shown) of the vehicle 30.

According to the embodiment as described above, one (second antenna) of the three axes antennas 21 to 23 of the wireless key 2 that is capable of satisfactorily receiving a signal from the inner antenna 12 of the vehicle 30 is recognized and selected according to the directivity of the antenna (first antenna) having received the highest level of the wireless signal when the wireless key 2 is located outside the vehicle 30 and the direction of movement of the wireless key 2 and it is determined that the wireless key 2 is located inside the vehicle 30 when the level of the wireless signal received by the second antenna is greater than the level of the wireless signal received by the first antenna. Consequently, it is possible to correctly determine whether the wireless key 2 is located inside or outside the vehicle 30 through such a simple process.

Meanwhile, in the embodiment as described above, the transmitting antenna 11 is disposed so as to have a directivity in the horizontal direction and the transmitting antenna 12 is disposed so as to have a directivity in the vertical direction. On the contrary, however, the transmitting antenna 11 may be disposed so as to have a directivity in the vertical direction and the transmitting antenna 12 may be disposed so as to have a directivity in the horizontal direction.

Also, in the embodiment as described above, the receiving unit 25 of the wireless key 2 may include receiving and processing systems provided individually for the X-axis antenna 21, the Y-axis antenna 22 and the Z-axis antenna 23. Alternatively, the X-axis antenna 21, the Y-axis antenna 22 and the Z-axis antenna 23 may be switched so as to be connected to the receiving unit 25 including a single receiving and processing system.

In the embodiment as described above, the transmitting antenna 11, as an outer antenna, is mounted in the door knob 32 of the right side front door 31 of the vehicle 30. This is because, in a vehicle having a right side steering wheel, a driver approaches the right side front door 31 when the driver gets in the vehicle 30. Also, the interior of the vehicle 30 is electromagnetically shielded from the wireless signal transmitted from the transmitting antenna 11 as described above by the door 31 made of a metal plate. In the present invention, however, the outer antenna is not limited to being mounted in the door knob of the right side front door. The outer antenna may be mounted in a door knob of a left side front door, which is not shown. In addition, outer antennas may be mounted in the respective door knobs. Also, the outer antennas may be formed in a front glass, a rear glass or door glasses or at the surface(s) of the front glass, the rear glass or the door glasses.

In addition, in the embodiment as described above, the transmitting antenna 12, as an inner antenna, is mounted in the ceiling of the vehicle 30 or at the surface of the ceiling of the vehicle 30. This is because, when the transmitting antenna is mounted at the ceiling, more preferably the center of the ceiling, it is possible for wireless key 2 to receive the wireless signal transmitted from the transmitting antenna without being affected by the structures, such as seats, in the vehicle wherever the wireless key 2 is located in the vehicle 30. Also, when the inner antenna is mounted at the ceiling, the inner antenna is not disturbed by a driver or a fellow passenger(s). In the present invention, however, the inner antenna is not limited to being mounted at the ceiling. The inner antenna may be mounted in the floor, in seats or inside doors of the vehicle 30.

Also, in the embodiment as described above, a vehicle, such as a vehicle, is shown as a main body, to which, however, the present invention is not limited. The main body may be a building, such as a house. For example, for a house, the outer antenna may be mounted at or around a door of the entrance of the house, which is the outside of the house, and the inner antenna may be mounted in the ceiling or wall of the entrance of the house. In addition, in the same manner as in the vehicle, electromagnetic shielding is preferably carried out so that the wireless signal transmitted from the outer antenna cannot penetrate into the house and the wireless signal transmitted from the inner antenna cannot be emitted from the house.

In addition, in the embodiment as described above, the wireless signal transmitted from the in-vehicle device 1 to the wireless key 2 is a low frequency (LF) signal and the wireless signal transmitted from the wireless key 2 to the in-vehicle device 1 is an ultra high frequency (UHF) signal, to which, however, the present invention is not limited. It is natural that other frequency bands may be used.

This application is based on Japanese Patent Application No. 2010-204343 which is herein incorporated by reference.

What is claimed is:

1. A wireless key system to perform wireless communication between a wireless key movable separately from a main body and a communication device mounted in the main body to thereby determine whether the wireless key has moved from a location outside of the main body to a location inside of the main body, wherein
   the communication device comprises a component which continuously or intermittently transmits a wireless signal through both an inner antenna provided inside the main body and an outer antenna provided outside the main body, the outer antenna having a directivity different from that of the inner antenna, and
   the wireless key comprises:
   a memory component;
   a plurality of antennas, each respective antenna having a different directivity from one another, and configured to receive the wireless signal transmitted from the communication device;
   a determination component which determines, at a first point in time, whether the wireless signal has been received by any one of the plurality of antennas;
   a measuring component which measures a direction of movement of the wireless key when receipt of the wireless signal has been determined by the determination component;
   a detecting component which detects which of the plurality of antennas that has received the wireless signal at the first point in time at a highest signal level, and stores that respective antenna as a first antenna in the memory component as information;
   a selecting component which selects one antenna of the plurality of antennas that has the same directivity as the inner antenna as a second antenna according to the direction of movement measured by the measuring component and the information specifying the first antenna detected by the detecting component; and
   a deciding component which decides that the wireless key is located at the location inside of the main body when a signal level of the wireless signal received by the second antenna at a subsequent point in time after the first point in time is greater than the signal level of the wireless signal received by the first antenna at the first point in time.

2. The wireless key system according to claim 1, wherein the inner antenna has a directivity in a vertical direction and the outer antenna has a directivity in a horizontal direction, and
   the plurality of antennas having different directivities from one another are three antennas having directivities different from each other by 90 degrees and constitute a three axes antenna.

3. The wireless key system according to claim 2, wherein the selecting component selects one of the plurality of antennas that has a directivity in the vertical direction as the second antenna.

4. The wireless key system according to claim 1, wherein the main body is a vehicle or a building.

5. A wireless key system to perform wireless communication between a wireless key movable separately from a main body and a communication device mounted in the main body to thereby determine whether the wireless key has moved from a location outside of the main body to a location inside of the main body, wherein
   the communication device comprises a component which continuously or intermittently transmits a wireless signal through both an inner antenna provided inside the main body and an outer antenna provided outside the main body, the outer antenna having a directivity different from that of the inner antenna, and
   the wireless key comprises:
   a memory component;
   a plurality of antennas, each respective antenna having a different directivity from one another, and configured to receive the wireless signal transmitted from the communication device;
   a determination component which determines, at a first point in time, whether the wireless signal has been received by any one of the plurality of antennas;
   a measuring component which measures a direction of movement of the wireless key when receipt of the wireless signal has been determined by the determination component;
   a detecting component which detects which of the plurality of antennas that has received the wireless signal at the first point in time at a highest signal level, and stores that respective antenna as a first antenna in the memory component as information;
   a selecting component which selects one antenna of the plurality of antennas that has the same directivity as the inner antenna as a second antenna according to the direction of movement measured by the measuring component and the information specifying the first antenna detected by the detecting component; and
   a deciding component which decides that the wireless key is located at the location inside of the main body when a signal level of the wireless signal received by the second antenna at a subsequent point in time after the first point in time is greater than the signal level of the wireless signal received by the first antenna at the first point in time,
   wherein the measuring component measures the direction of movement through an acceleration sensor using a position of the wireless key when the receipt of the wireless signal at the first point in time has been determined by the determination component as a reference point.

6. The wireless key system according to claim 5, wherein the inner antenna has a directivity in a vertical direction and the outer antenna has a directivity in a horizontal direction, and
   the plurality of antennas having different directivities from one another are three antennas having directivities different from each other by 90 degrees and constitute a three axes antenna.

7. The wireless key system according to claim 6, wherein the selecting component selects one of the plurality of antennas that has a directivity in the vertical direction as the second antenna.

8. The wireless key system according to claim 5, wherein the main body is a vehicle or a building.

9. A wireless key location determination method of a wireless key system to perform wireless communication between the wireless key movable separately from a main body and a communication device mounted in the main body to thereby determine whether the wireless key has moved from a location outside of the main body to a location inside of the main body, the wireless key comprising a plurality of antennas, each respective antenna having a different directivity from one another, the method comprising:

- transmitting, continuously or intermittently, a wireless signal through both an inner antenna provided inside the main body and an outer antenna provided outside the main body, the outer antenna having a directivity different from that of the inner antenna;
- determining, at a first point in time, whether the wireless signal has been received by any one of the plurality of antennas;
- measuring a direction of movement of the wireless key when the receipt of the wireless signal at the first point in time has been determined at the determination step;
- detecting which of the plurality of antennas that has received the wireless signal at the first point in time at a highest signal level and storing that respective antenna as a first antenna in memory as information;
- selecting one antenna of the plurality of antennas that has the same directivity as the inner antenna as a second antenna according to the direction of movement measured at the measurement step and the information specifying the first antenna detected during the detecting step; and
- deciding that the wireless key is located at the location inside of the main body when a signal level of the wireless signal received by the second antenna at a subsequent point in time after the first point in time is greater than the signal level of the wireless signal received by the first antenna at the first point in time.

10. A wireless key location determination method of a wireless key system to perform wireless communication between the wireless key movable separately from a main body and a communication device mounted in the main body to thereby determine whether the wireless key has moved from a location outside of the main body to a location inside of the main body, the wireless key comprising a plurality of antennas, each respective antenna having a different directivity from one another, the method comprising:

- transmitting, continuously or intermittently, a wireless signal through both an inner antenna provided inside the main body and an outer antenna provided outside the main body, the outer antenna having a directivity different from that of the inner antenna;
- determining, at a first point in time, whether the wireless signal has been received by any one of the plurality of antennas;
- measuring a direction of movement through an acceleration sensor using a position of the wireless key as a reference point when the receipt of the wireless signal at the first point in time has been determined at the determination step;
- detecting which of the plurality of antennas that has received the wireless signal at the first point in time at a highest signal level and storing that respective antenna as a first antenna in memory as information;
- selecting one antenna of the plurality of antennas that has the same directivity as the inner antenna as a second antenna according to the direction of movement measured at the measurement step and the information specifying the first antenna detected during the detecting step; and
- deciding that the wireless key is located at the location inside of the main body when a signal level of the wireless signal received by the second antenna at a subsequent point in time after the first point in time is greater than the signal level of the wireless signal received by the first antenna at the first point in time.

* * * * *